US008146052B2

(12) United States Patent
Bray (10) Patent No.: US 8,146,052 B2
(45) Date of Patent: Mar. 27, 2012

(54) METHOD AND SYSTEM FOR HIERARCHICAL HARDWARE MAPPING FOR SOFTWARE DESIGN

(75) Inventor: Steven Christopher Bray, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 1250 days.

(21) Appl. No.: 11/894,951

(22) Filed: Aug. 22, 2007

(65) Prior Publication Data

US 2008/0052665 A1 Feb. 28, 2008

Related U.S. Application Data

(60) Provisional application No. 60/839,234, filed on Aug. 22, 2006.

(51) Int. Cl.
*G06F 9/44* (2006.01)
*G06F 15/16* (2006.01)

(52) U.S. Cl. ........ 717/105; 717/100; 717/106; 717/109; 717/113; 709/250

(58) Field of Classification Search .................... None
See application file for complete search history.

(56) References Cited

U.S. PATENT DOCUMENTS

| | | | |
|---|---|---|---|
| 6,799,101 B2* | 9/2004 | Hawig et al. .................. 701/35 |
| 7,085,702 B1* | 8/2006 | Hwang et al. .................. 703/15 |
| 7,293,113 B1* | 11/2007 | Krishna et al. ................ 709/250 |
| 2004/0015816 A1* | 1/2004 | Hines et al. ................... 717/101 |
| 2004/0044990 A1* | 3/2004 | Schloegel et al. ............ 717/113 |
| 2004/0254689 A1* | 12/2004 | Blazic et al. ..................... 701/1 |
| 2005/0039160 A1* | 2/2005 | Santori et al. ................ 717/104 |
| 2005/0039162 A1* | 2/2005 | Cifra ............................ 717/105 |
| 2005/0091602 A1* | 4/2005 | Ramamoorthy et al. ...... 715/763 |
| 2005/0107998 A1* | 5/2005 | McLernon et al. ............. 703/22 |
| 2006/0041859 A1* | 2/2006 | Vrancic et al. ................ 717/105 |
| 2006/0053407 A1* | 3/2006 | Kodosky et al. ............. 717/105 |
| 2006/0064294 A1* | 3/2006 | Clark .............................. 703/22 |
| 2006/0064669 A1* | 3/2006 | Ogilvie et al. ................ 717/106 |
| 2006/0064670 A1* | 3/2006 | Linebarger et al. .......... 717/106 |
| 2006/0143579 A1* | 6/2006 | Torgerson .................... 715/854 |
| 2006/0149838 A1* | 7/2006 | Hunt et al. .................... 709/224 |
| 2006/0173585 A1* | 8/2006 | Hanzawa ......................... 701/1 |
| 2006/0215825 A1* | 9/2006 | Boutin et al. ................. 379/111 |
| 2006/0229742 A1* | 10/2006 | Boutin et al. ................... 700/32 |

(Continued)

OTHER PUBLICATIONS

"Java-prototyping of Hardware/Software CBS Using a Behavioral OO Model", Mendelbaum et al., Aug. 2002, IEEE, pp. 1-9; <http://ieeexplore.ieee.org/search/searchresult.jsp?openedRefinements=* &filter=AND(NOT(4283010803))&pageNumber=41 &searchField=Search All&queryText=hardware software software>.*

(Continued)

*Primary Examiner* — Thuy Dao
*Assistant Examiner* — Ben Wang
(74) *Attorney, Agent, or Firm* — Finnegan, Henderson, Farabow, Garrett & Dunner, LLP (57) ABSTRACT

The present disclosure is directed toward a method for hierarchical hardware mapping in a software design environment. The method comprises the step of providing a software design tool on a graphical interface of a computer system. The method also includes receiving, in the software design tool, graphical representation of at least a portion of software and receiving, in the software design tool, graphical representation of at least a portion of hardware. The method may further include receiving, in the software design tool, one or more bindings between software and hardware, wherein the one or more bindings form a set of bindings, and storing the set of bindings for use in one or more software designs.

26 Claims, 6 Drawing Sheets

U.S. PATENT DOCUMENTS

| | | | | |
|---|---|---|---|---|
| 2006/0271341 A1* | 11/2006 | Brown et al. | | 703/1 |
| 2007/0022403 A1* | 1/2007 | Brandt et al. | | 717/100 |
| 2007/0022405 A1* | 1/2007 | Bray | | 717/106 |
| 2007/0150861 A1* | 6/2007 | Bray | | 717/109 |
| 2008/0127058 A1* | 5/2008 | Bray | | 717/106 |

OTHER PUBLICATIONS

"Embedded System Engineering Using C/C++ Based Design Methodologies", Talarico et al., 2005 IEEE, pp. 1-8; <http://www.google.com/#q=hierarchical+hardware+mapping+for+software+design>.*

"hwloc—a Generic Framework of Managing HW Affinities in HPC Applications", Broquedis et al., PDP 2010, the 18th Euromicor International Conference on Parallel, Distributed and Network-Based Computing (2010); pp. 1-7; <http://www.google.com/#q=hierarchical+hardware/software+mappingsz>.*

"A Hardware/Software Reconfigurable Architecture for Adaptive Wireless Image Communication", Panigrahi et al., 2002, pp. 1-6, <http://dl.acm.org/results.cfm?query=hierarchical%20hardware%20software%20mappings%2C%20software%20design>.*

* cited by examiner

METHOD AND SYSTEM FOR HIERARCHICAL HARDWARE MAPPING FOR SOFTWARE DESIGN

This application claims priority to and the benefit of the filing date of U.S. Provisional Patent Application No. 60/839,234, filed Aug. 22, 2006, which is herein incorporated by reference in its entirety.

TECHNICAL FIELD

The present disclosure relates generally to software design tools and, more particularly, to methods and systems for hierarchical hardware mapping in software design environments.

BACKGROUND

Embedded systems are used in a variety of today's electromechanical systems. These systems are often configured to perform one or more specialized tasks associated with the system in which they are deployed. In many cases, these embedded systems perform operational and control functions associated with a larger system, functioning as the "brain" of the system. For example, an embedded system may include an electronic control unit (ECU) programmed to monitor and/or control particular aspects and/or operations associated with the system in which it operates. Embedded systems are often highly specialized and critical to the performance of the systems in which they are deployed.

In order to minimize development and manufacturing costs, generic electronic control units (ECUs) were developed that are compatible with a variety of different systems. Once deployed in a system, these generic ECUs may be customized using processor-executable embedded software loaded into a memory device associated with the ECU. This embedded software may contain instructions for controlling virtually every operation associated with the system. By customizing operations of each embedded system at the software level, the same ECU hardware may be employed in variety of applications, allowing for mass-production of the generic hardware. Further, because the functionality of the system is defined almost exclusively in software, updates, modifications, and upgrades may be made to the system without necessitating replacement of the system hardware, thereby reducing repair and upgrade costs.

Because software for embedded systems may define virtually all functional aspects associated with the system, the design of software for these systems may be complicated, time intensive, and require highly specialized knowledge of software development techniques. Embedded software associated with an engine controller may comprise hundreds of thousands of lines of code and total embedded software on machines can be millions of lines of code.

One system for simplifying the design of control software for these types of generic hardware systems is described in U.S. Patent Application Publication No. 2004/0044990 ("the '990 publication") to Schloegel et al. The '990 publication describes a software design tool that provides a graphical interface that allows users to arrange graphical modeling entities. Code generators are attached to the modeling entities and these modeling entities are traversed to generate software for the system. With this model-based development, a system model can be used through the phases of development, including concept design, analysis and simulation, automatic code generation, and testing. Significant benefits are possible using a graphical design interface and single design representation throughout development.

Model-based notations, methodologies, and tools are advancing in capabilities. Modeling notations include, for example, function block diagram and Unified Modeling Language (UML)™. Several tools support model-based development with these notations. Both of these notations support hierarchical composition. New design entities can be implemented by composition of other design entities to multiple levels. Hierarchical composition is also supported by all traditional software programming languages. Software programming languages provide multiple means to support hierarchical composition including, for example, nested source files, function calls, data composition by reference, data composition by containment, and macro definitions. All of these support multiple levels of composition. UML was developed to model software designs and supports most of these means of composition. Function block notation was not designed to model software and only supports one primary means of hierarchical composition; blocks may be implemented as compositions of other blocks. Some tools provide various mechanisms to partition a model into libraries of blocks, palettes of blocks, and/or files and file paths for storage of blocks but these are not generally independent of the block hierarchy.

Hierarchical composition is advantageous for several facets of embedded software: composition of behavior and data, composition of the physical system, and composition of products. These are related but are driven by different goals. Composition of behavior and data decomposes a system into manageable pieces with loose coupling and high internal cohesion. It supports reuse of software from a perspective of shared logic and data design. Physical composition represents constraints from the physical design of the system. Product composition reflects the needs of the product market including product families, product options, product variants, product customization, product growth path, time-to-market, and numerous other factors.

Currently, model-based development tools employing function block notations are more mature and often better suited to development of some embedded control systems. These provide the advantages of model-based development but lack the multiple means of composition of traditional software development languages. These tools are typically less capable of supporting the differing goals of composition. Less reuse is possible in product lines and through changes in physical design.

The presently disclosed system and method for hierarchical hardware mapping for software design are directed toward overcoming one or more of the problems set forth above.

SUMMARY OF THE INVENTION

In accordance with one aspect, the present disclosure is directed toward a method for hierarchical hardware mapping in a software design environment. The method comprises the step of providing a software design tool on a graphical interface of a computer system. The method may also include receiving, in the software design tool, graphical representation of at least a portion of software and receiving, in the software design tool, graphical representation of at least a portion of hardware. The method may further include receiving, in the software design tool, one or more bindings between software and hardware, wherein the one or more bindings form a set of bindings and storing the set of bindings for use in one or more software designs.

According to another aspect, the present disclosure is directed toward a computer system that includes a display and a processor configured to provide a software design tool to the display. The processor may be configured to provide a software design tool on a graphical interface of a computer system. The processor may also be configured to receive, in the software design tool, graphical representation of at least a portion of software. The processor may be further configured to receive, in the software design tool, graphical representation of at least a portion of hardware. The processor may also be configured to receive, in the software design tool, one or more bindings between software and hardware, wherein the one or more bindings form a set of bindings and store the set of bindings for use in one or more software designs.

In accordance with yet another aspect, the present disclosure is directed toward a method for mapping a software hierarchy to hardware in a software design environment. The method may include providing a software design tool on a graphical interface of a computer system. The method may also include receiving, in the software design tool, graphical representation of at least a portion of software. The method may further include receiving, in the software design tool, a user-defined designation associating a level of the software hierarchy with a hardware device. The method may also include storing the user-defined designation for use in one or more software designs.

DETAILED DESCRIPTION

An embodiment of the present invention involves systems and methods for supporting higher levels of software reuse in a software development environment that relies on software generation from a model and/or other representation of the software. This is achieved through separation of the design of hardware-specific portions of the software and providing a hierarchical elaboration of these hardware-specific portions that supports building a system composition through reuse of partial compositions. For example, an engine controller with a cruise control feature and an engine control with a fan control feature could both be based on a shared composition of the basic engine controller.

Figure 1:
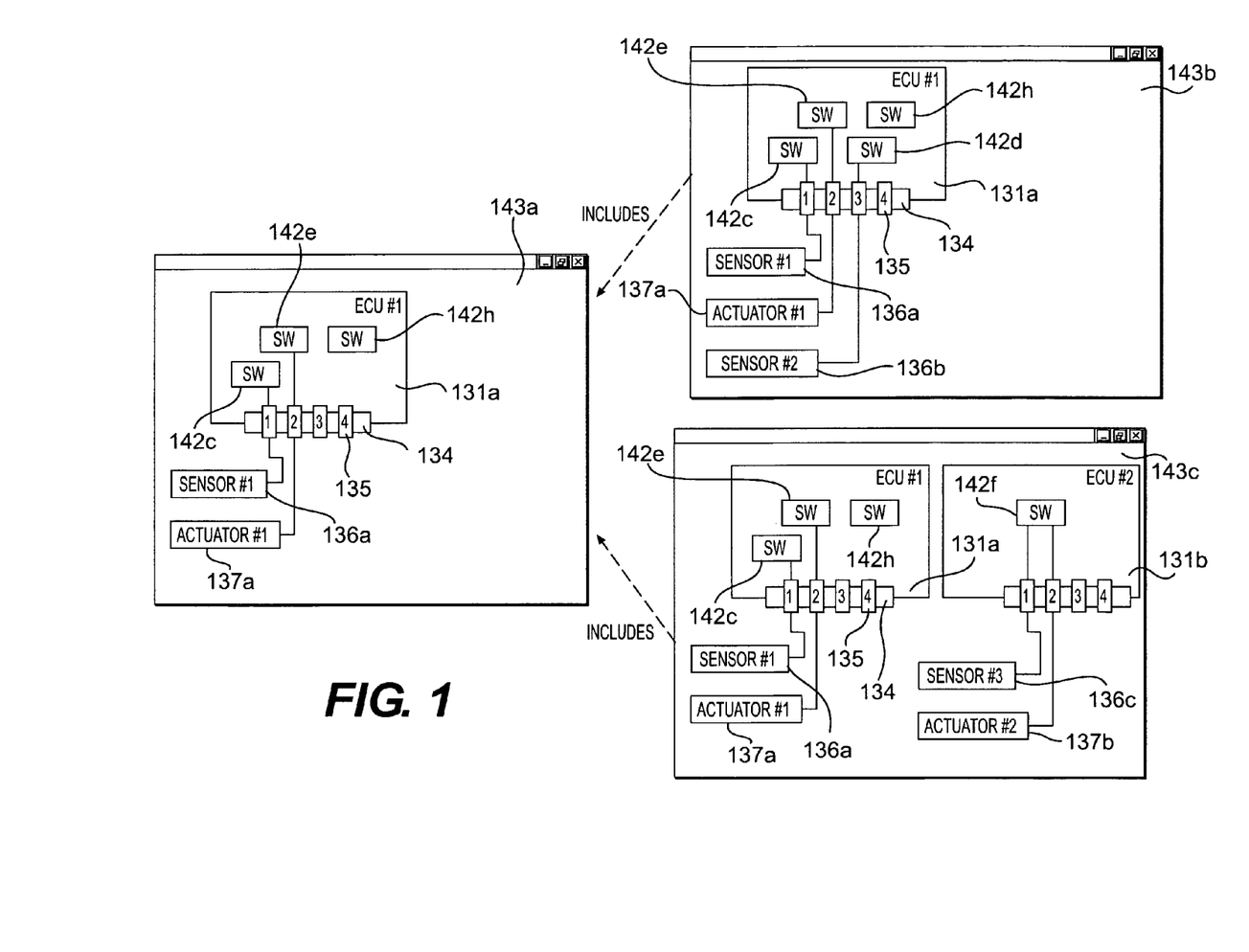
FIG. 1 illustrates an exemplary software design environment that includes a partial system composition that may be mapped to other system compositions or designs, consistent with certain disclosed embodiments.

FIG. 1 illustrates an exemplary use of a shared partial system composition 143a in two other system compositions, 143b and 143c. System composition 143a may include an electronic control unit (ECU) 131a, sensor 136a, and actuator 137a. ECU 131a may include one or more connectors 34 having one or more pins 135 for communicatively coupling ECU 131a with other hardware-devices, including sensors, actuators and other ECUs. ECU 131a may include any number of connectors 134, each of which may be associated with one or more pins. It is contemplated that the hardware devices connected to ECU 131a may also include one or more pins, which may be connected to ECU 131a and/or other systems associated with system composition 143a via connectors 134. Pins 135 and connectors 134 may include electrical, optical, electro-magnetic (wireless), and any other components suitable for communicatively coupling ECU 131a to one or more other components or subsystems associated with system composition 143a. Those skilled in the art will recognize that, in addition to pins 135 and connectors 134, ECUs may employ communication electronics, signal processors, wires, and/or any other devices or equipment for communicatively coupling ECU 131a with other hardware systems, devices, or components.

ECU 131a may comprise one or more processors (not shown) communicatively coupled to memory devices via internal electronic devices and circuits. ECU 131a may be configured to receive, store, load, and execute embedded software from a software design tool. ECU 131a may include or be associated with software 142c, 142e, and 142h, each comprising a portion of the total software employed in ECU 131a. As illustrated in FIG. 1, software 142c may be associated with connector pin 1, forming a binding between software 142c and connector pin 1. Similarly, software 142e may be associated with connector pin 2, forming a binding between software 142e and pin 2. Software 142h depicts software that has no direct binding to a pin. Software 142c, 142e, and 142h have a binding to ECU 131a and to a processor and memory device(s) associated therewith.

According to an exemplary embodiment, sensor 136a may be connected to pin 1, creating an indirect binding with software 142c by virtue of the common binding to pin 1. Similarly, through pin connections, actuator 137a has binding to software 142e, sensor 136b to software 142d, sensor 136c to software 142f, and actuator 137b to software 142f. These bindings imply that the software is compatible with the corresponding sensor or actuator. In another embodiment, a software design tool may have access binding rules and may be configured to enforce these rules.

System composition 143a may define bindings between portions of software to one or more portions of hardware. This software may have binding with ECU, processor, virtual memory space, memory devices, and connector pins. Bindings may embody indirect bindings (e.g. flash files, device registers, device software, etc.) employed to realize the directly specified bindings. A software design tool can use these bindings to generate the portions of software that bind the software to the hardware.

In some situations, software and hardware characteristics may restrict viable bindings. For example, software 142c and/or sensor 136a may only be compatible with pins 1 and 3. In another example, software 142h may only be compatible with a particular ECU type or with a particular processor used in a family of ECUs. According to one embodiment, a software design tool may have access to binding rules and may be configured to enforce these rules.

By way of the software reuse principles described herein, system composition 143b may be configured to include system composition 143a. As illustrated in FIG. 1, system composition 143b may include all of the bindings in system composition 143a, plus an additional sensor 136b connected to pin 3 and associated with software 142d which may be simultaneously bound to pin 3. Similarly, system composition 143c may include system composition 143a, plus an additional ECU 131b. System composition 143c may also include sensor 136c connected to pin 1, actuator 137b connected to pin 2, and software 142f connected to both pins 1 and 2. System compositions 143b and 143c depict different embedded system products that include the shared design content of system composition 143a.

Software design tool 140 (see FIG. 4) may include a feature to inhibit directly changing system composition content from any other system composition that includes an original or previously-configured software composition. Further, the software design tool may provide a shadow image or other visual representation of an original or previously-configured software composition, which may notify a user of the software tool that configurations associated with the shadow image may not be changed in the current design view. According to one embodiment, the software design tool may provide convenient means for navigating between a system composition that comprises content and a system composition that allows the user to define the content. Further, the software design tool may provide a convenient and/or automatic means to synchronize changes to the content definition to all points of reference of the shared content.

The hierarchy of system composition defines physical composition of an embedded system and the bindings between software and the hardware. The hierarchy of system composition may add generated software, control the inclusion of existing software, and/or have other affects on the construction and deployment of software. The software may often be part of another hierarchy, for example a hierarchy of function blocks. Since both hierarchies contribute to the generated software, there exist explicit or implicit associations or mappings between these hierarchies.

In one alternative embodiment, certain blocks in a function block hierarchy may be designated for reference in the system composition. In this alternative, the two hierarchies are mapped at a single level in the software hierarchy. The software hierarchy is independent below that level. The system composition implies one software hierarchy above that level. The software design tool may auto-generate a function block hierarchy above the designated software blocks. It may generate several levels, for example, blocks bound to the same virtual memory space may be composed as a block, blocks bound to the same processor may be composed as another block, blocks bound to the same ECU may be composed as yet another block, and one or more of these blocks may be composed as the block for the embedded system. According to this embodiment, signal flow between the auto-generated blocks may be defined through the use of use of named signals, commonly referred to as publish/subscribe design pattern.

Figure 2:
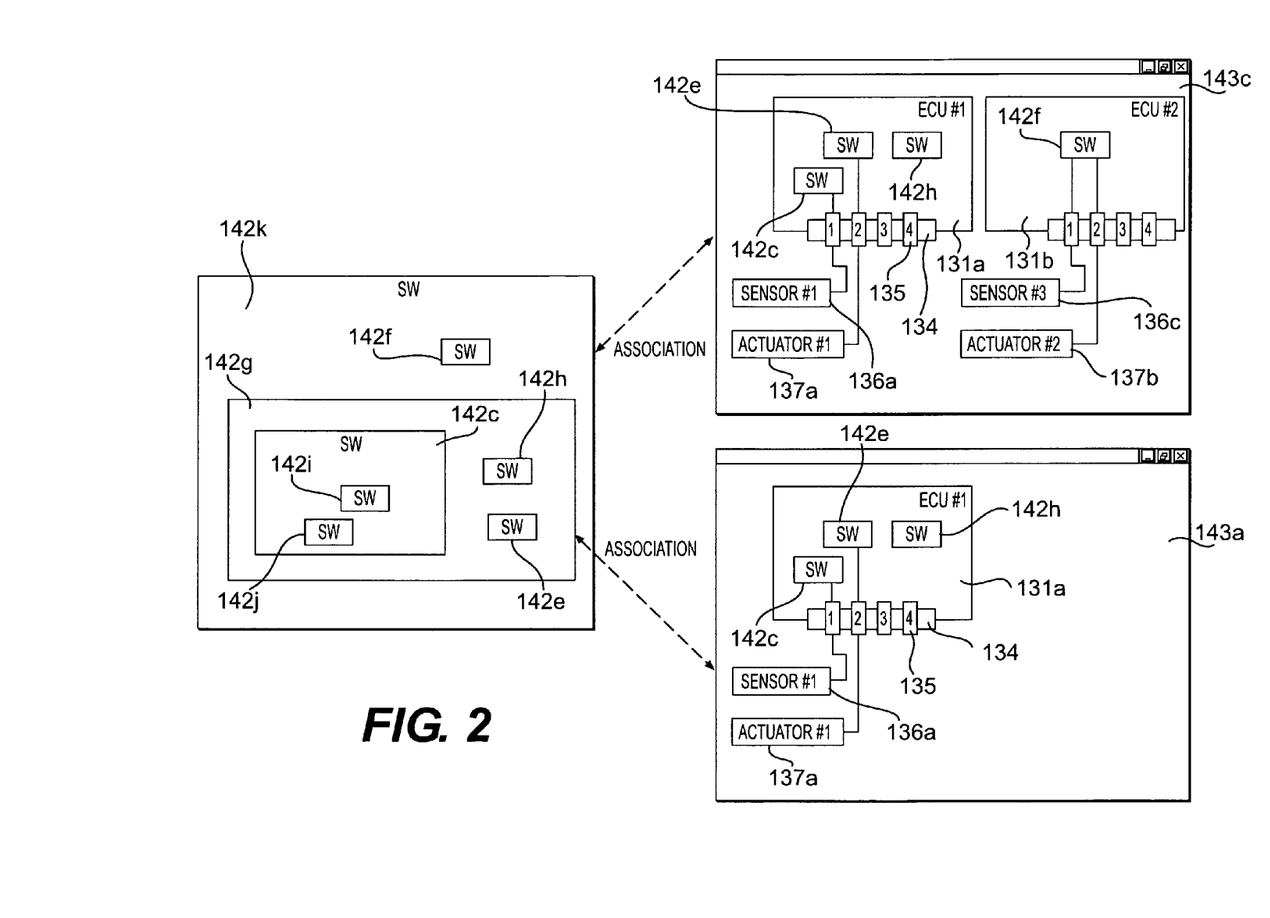
FIG. 2 illustrates an exemplary hierarchical function block that may be associated with multiple system compositions, consistent with certain disclosed embodiments.

According to another alternative embodiment, the same hierarchy may be used for both the function blocks and the system composition. However, in this embodiment block composition and system composition are optional at each level and may be built up in any desired order. FIG. 2 illustrates one exemplary segment of this hierarchy. This figure includes system composition 143a and 143c as previously described in FIG. 1. System composition 143a may be included in system composition 143c. Also shown is a view of the hierarchy from a corresponding portion of the function block hierarchy. Function block 142k includes function blocks 142g and 142f. Function block 142g includes function blocks 142c, 142h, and 142e. Similarly, function block 142c includes function blocks 142i and 142j.

According to this embodiment, system composition 143a is associated with function block 142g and system composition 143c is associated with function block 142k. These associations may be implicit in the design tool where each block can be viewed from either the perspective of nested function blocks or from the perspective of nested system composition. A typical view of nested function blocks show only one level with means to navigate to view inside nested blocks (FIG. 2 exposes the nested function blocks to simplify this example). Conversely, a view of nested system composition may show a view that merges all of the nested content. It may also provide some visual indication of nested content to indicate that it can not be edited at a particular level. It may also provide a convenient means of navigation between or among multiple levels.

In this example, the use of system composition 143a in 143c is implied by the nesting of function block 142g within 142k. The inclusion of one system composition within another is not directly specified. Each level of system composition corresponds to a function block. Levels of function blocks may be added to create additional layers of system composition. Content can be added in either order. A lower level may be used to add an ECU and sensors to the system, while higher levels may be used to add software for defining operations of the ECU. Alternately, lower levels may be used to construct the software and higher levels may be used to define the software bindings to the hardware.

In yet another embodiment, usage restrictions may be attached to blocks in a function block hierarchy. For example, all content of a block may be restricted to one ECU, one processor, one virtual memory space, and/or one thread of execution. In this alternative, some of the bindings to hardware may be implied by restrictions on the blocks. A scope constraint on one block would apply to all of the blocks included within it. For example, if one block is restricted to a single ECU then an implicit binding is created between all of the blocks that are nested within it and the ECU. The tool may identify conflicts in restrictions and/or may contain rules for resolution of these conflicts. With this alternative, independent logical and physical views may be managed in the same hierarchy.

Figure 3:
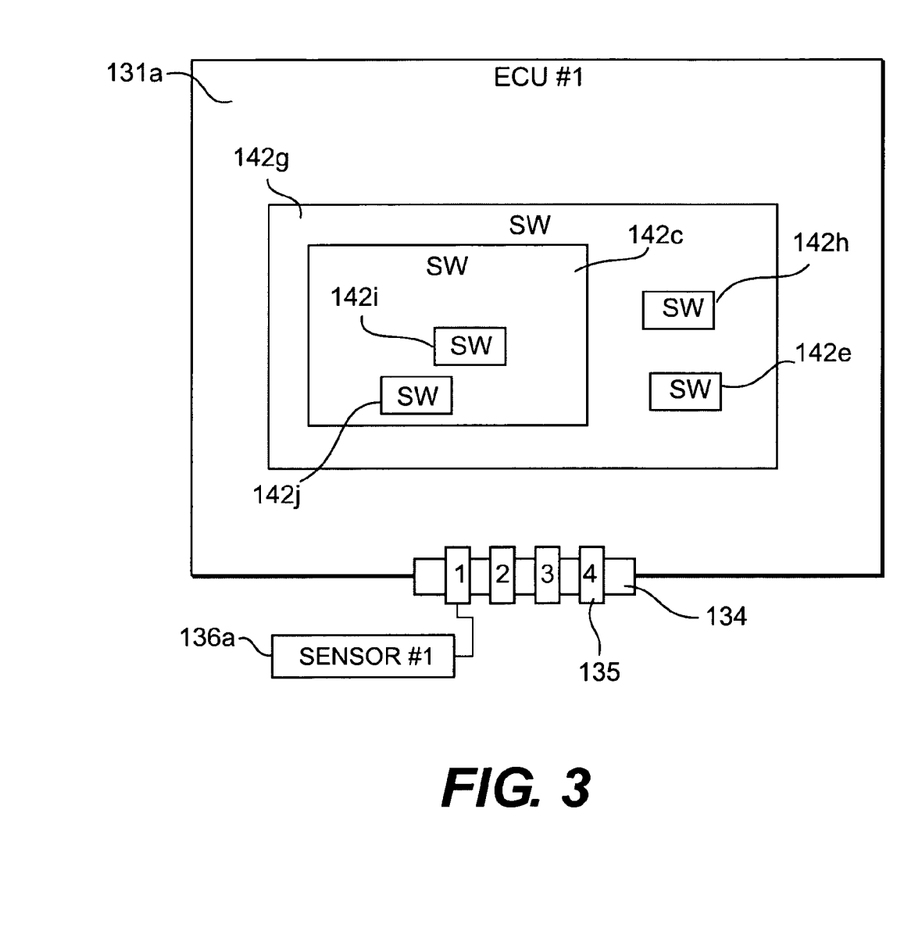
FIG. 3 illustrates the exemplary multi-level hierarchical function block of FIG. 2, further including an association of a hardware device with one function block in the hierarchy.

In another embodiment, a function block may be designated to be associated with a specific hardware device, such as a particular type of sensor or actuator. For example, FIG. 3 provides an illustration of this association through use of a combination of superposition of several levels of function block composition on one level of system composition. As illustrated in FIG. 3, function block 142c may correspond to sensor 136a. It is intended that the association is stored as a general association between reusable software corresponding to function block 142c and with a sensor of the type employed in 136a. This association may be stored and used multiple times within one or multiple systems. For example, use of function block 142c implies the use of a sensor of the type employed in 136a. Conversely, use of sensor 136a implies the use of function block 142c or with the use of an alternate function block equivalently associated with a sensor of the type employed in 136a. Function block 142c is specific to the type of sensor and may be independent of the use of the sensor. For example the binding to a connector pin, thread execution rate and similar details of function block 142c may be in a general form that can be independently specified in system compositions. Conversely, the function blocks that contain 142c may be specific to the particular use of a sensor of that type.

In one embodiment, a name of block 142c may be equated to the name of sensor 136a. Block 142c represents the software for reading and conditioning the signal, and sensor 136a represents a physical instance of that type of sensor. A software design tool may allow the user to edit either the function block view or the system composition view and associate the same name with both views.

In another embodiment, binding sensor 136a to ECU 131a and pin 1 implies the same bindings for function block 142c. Alternatively, binding 142c to ECU 131a and pin 1 implies the same bindings for sensor 136a.

In yet another embodiment, binding sensor 136a in a system composition implies that the corresponding function block must be used in the corresponding function block hierarchy. A design tool may add it to a function block design palette or provide alternate indication and convenience for adding it to the function block hierarchy. The tool may also provide indication if the user attempts to simulate or generate software before completing the required design steps. A name applied to the sensor may be shown with the function block. For example, a tool user may add a speed sensor of specific type to a system composition and name it "engine speed." When the user views any level of the function block hierarchy, the tool may now show a block labeled "engine speed" until it is selected and added to the function block hierarchy for this embedded system design. Similarly, the tool may provide sensor "engine speed" in the system composition view if the associated function block is first used in the function block hierarchy.

Figure 4:
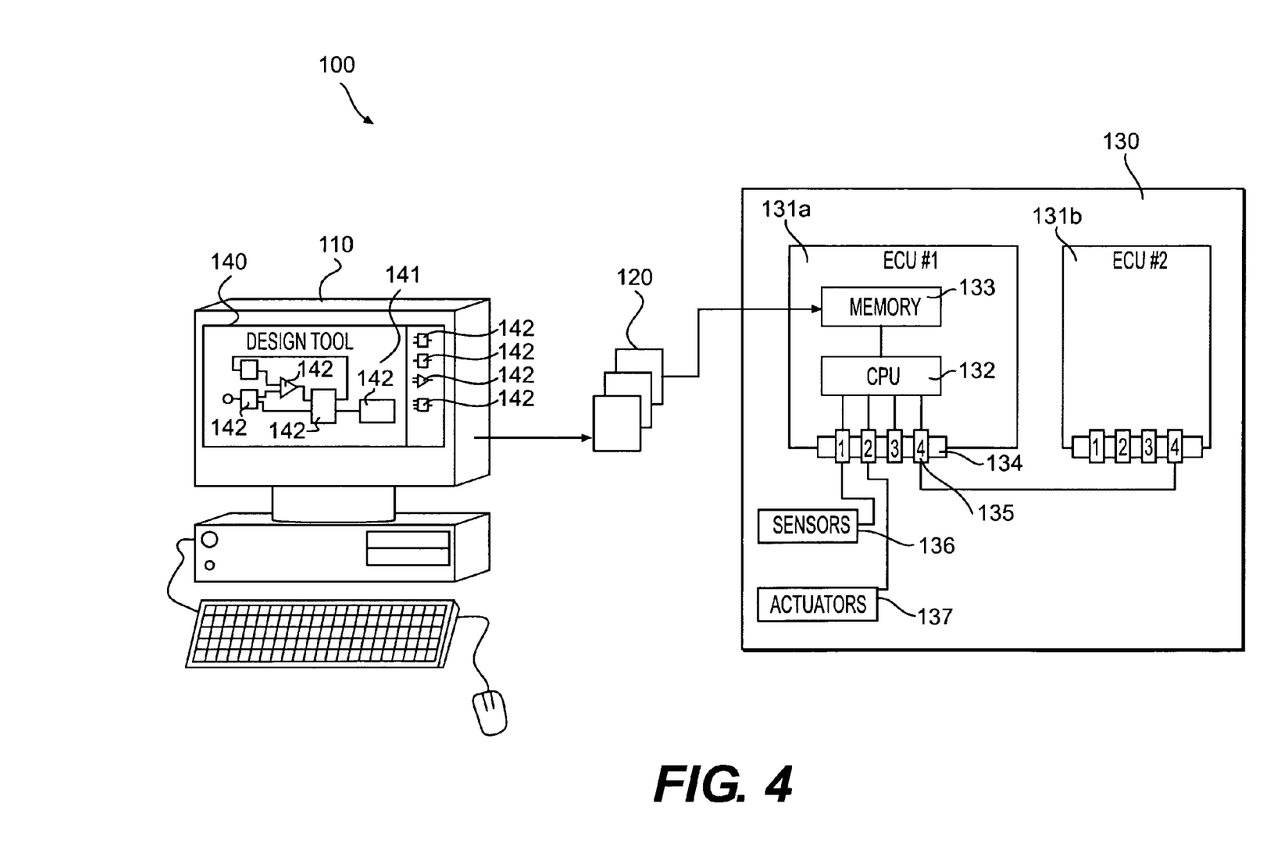
FIG. 4 illustrates an exemplary software design environment that includes a software design tool on which systems and methods consistent with the disclosed embodiments may be implemented.

FIG. 4 illustrates an exemplary software design environment 100 consistent with the disclosed embodiments. Software design environment 100 may include any environment that enables a user to develop software systems, generate embedded software associated with the developed software systems, and provide the generated code to an embedded system that executes the code to perform one or more tasks. For example, software design environment 100 may include a computer system 110 for running software design programs to generate desired embedded software 120. Software design environment 100 may also include an embedded system 130 communicatively coupled to computer system 110 and configured to receive and store embedded software 120 generated by computer system 110. It is contemplated that software design environment 100 may include additional, fewer, and/or different components than those listed above. For example, software design environment 100 may include additional computer systems communicatively coupled to one another via a communication network (e.g., the Internet, local area network, etc.) for sharing resources associated with software design environment 100.

Embedded software 120 may include any type of computer executable instructions for use on and/or by embedded system 130. For example, embedded software 120 may include control software, operating system software, dataflow system software, or any other type of software. Embedded software 120 may include instructions for performing various tasks such as, for example, controlling an operation associated with a component or subsystem; directing the flow of information between one or more components or subsystems; collecting, analyzing, monitoring, and/or modifying operations associated with a component; or any other suitable operation associated with embedded system 130. It is contemplated that embedded software may include a processor executable software program or any portion or stub of embedded software associated therewith.

Embedded system 130 may include any system in which operations of the system are defined substantially by customized programming associated with control software. For example, embedded system 130 may include a generic electronic control unit (ECU) 131a for use in heavy machinery or vehicle systems, the structure of which may be adapted for use in a variety of machines. Operations associated with embedded system 130 may be defined and/or updated by embedded software 120, which may be stored on and executed by embedded system 130.

Embedded system 130 may include any system configured to receive embedded software 120 generated by computer system 110. According to one embodiment, embedded system 130 may be configured to receive embedded software 120 indirectly from a portable computing device, such as a service tool. This service tool may be configured to receive embedded software 120 generated by computer system 110 from distribution media or from a site computer that has by direct or indirect means received the embedded software 120 generated by computer system 110. The service tool may be configured to distribute the embedded software to embedded system 130 via any wired or wireless communication link. Alternatively and/or additionally, the portable computing device (e.g., service tool) may include a storage device for storing embedded software 120 generated by computer system 110 for subsequent distribution to embedded system 130.

Embedded system 130 may include any type of device for controlling, operating, and/or monitoring one or more devices and/or systems. Embedded system 130 may constitute a control system for a work implement; an engine, a transmission, steering, braking, or any other system associated with a machine; a status or health monitoring system; and/or a diagnostic system.

According to one embodiment, embedded system 130 may embody an electronic control unit (ECU) 131a. Electronic control unit (ECU) 131a may include a memory 133 for storing and accessing embedded software 120, a processor 132 for executing embedded software 120, and a connector 134 and connector pins 135 for communicatively coupling with sensors 136 and actuators 137 associated with embedded system 130. Embedded system 130 may be configured to receive measurements and commands from sensors 136 and generate commands to actuators 137 for controlling, and/or otherwise operating each of the components in the embedded system, as defined in embedded software 120 executed by processor 132.

Additionally, embedded system 130 may contain a second electronic control unit 131b or any plurality of electronic control units, each may have corresponding memory 131, processor 132, and embedded software 120. Connector pins 135 may be used to communicatively couple electronic control units 131a and 131b.

Computer system 110 may include one or more computer programs that, when executed, aid in the development of embedded software 120 for use by embedded system 130. For example, computer system 110 may include a software design tool 140 for assembling, configuring, analyzing, generating, compiling, debugging, and/or testing embedded software 120 for use by embedded system 130. Software design tool 140 associated with computer system 110 may include, for example, a design interface 141 for arranging one or more software blocks 142 to create a desired software model or functional representation of embedded system 130. Computer system 110 may execute the computer programs when prompted by a user associated with computer system 110.

Figure 5:
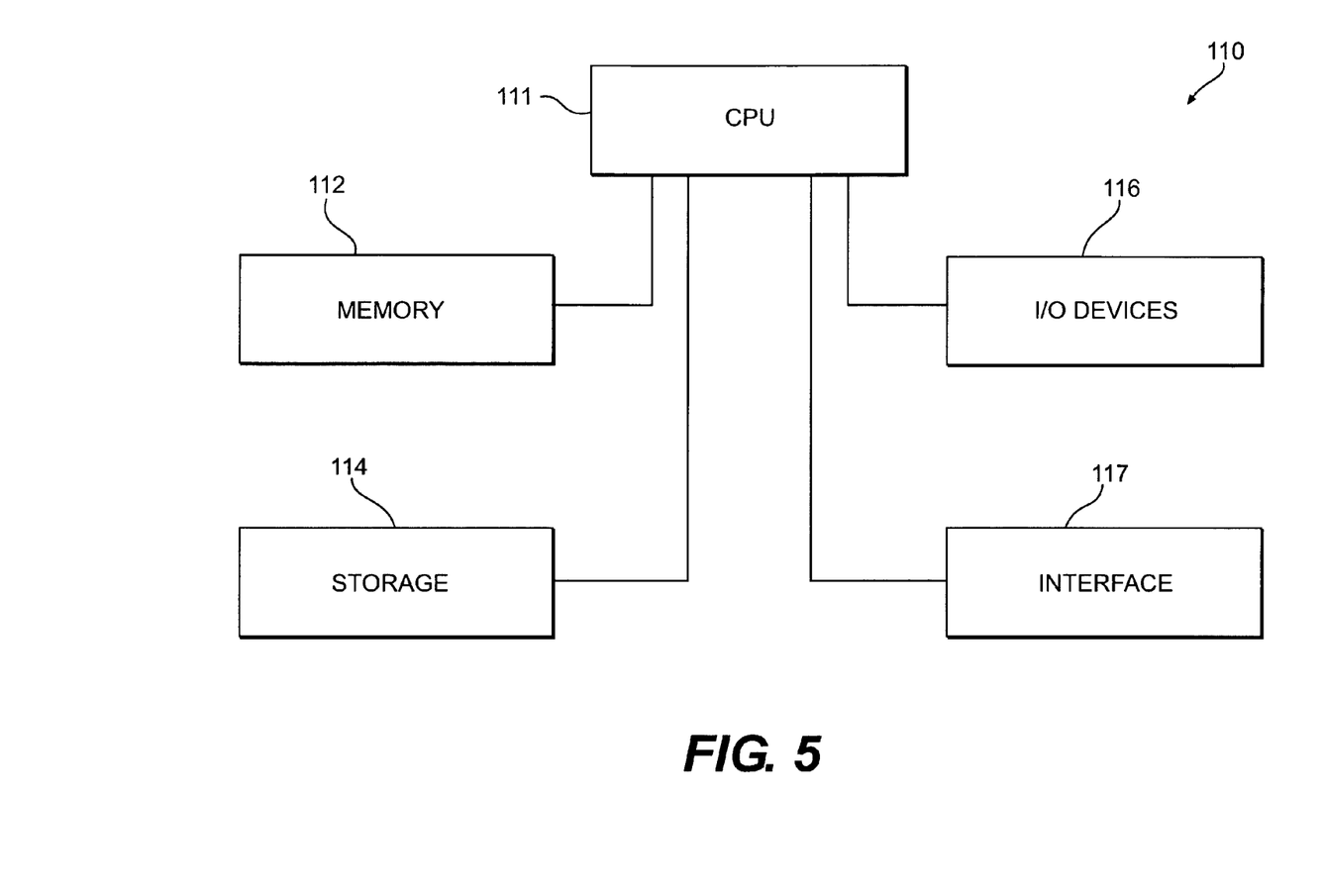
FIG. 5 provides a schematic diagram illustrating certain exemplary components of the software design environment of FIG. 4.

Computer system 110 may include any type of processor-based system on which processes and methods consistent with the disclosed embodiments may be implemented. For example, as illustrated in FIG. 5, computer system 110 may include one or more hardware and/or software components configured to execute software programs, such as software design tool 140. For example, computer system 110 may include one or more hardware components such as, for example, a processor 111, a memory module 112, a storage 114, one or more input/output (I/O) devices 116, and an interface 117. Alternatively and/or additionally, computer system 110 may include one or more software components such as, for example, a computer-readable medium including computer-executable instructions for performing methods consistent with certain disclosed embodiments. Computer system 110 may include additional, fewer, and/or different components than those listed above. It is understood that the components listed above are exemplary only and not intended to be limiting.

A central processing unit (CPU) 111 may include one or more processors, each configured to execute instructions and process data to perform one or more functions associated with computer system 110. As illustrated in FIG. 5, CPU 111 may be communicatively coupled to memory 112, storage 114, I/O devices 116, and interface 117. CPU 111 may be configured to execute sequences of computer program instructions to perform various processes, which will be described in detail below. The computer program instructions may be loaded into memory 112 for execution by CPU 111.

Storage 114 may include any type of mass storage device configured to store information that CPU 111 may need to perform processes consistent with the disclosed embodiments. For example, storage 114 may include one or more magnetic and/or optical disk devices, such as hard drives, CD-ROMs, DVD-ROMs, or any other type of mass media device.

Storage 114 may include one or more software and/or hardware components that cooperate to store, organize, sort, filter, and/or arrange data used by computer system 110 and/or CPU 111. For example, storage 114 may include a software block library that includes software block templates, previously used software blocks, portions of embedded software associated with one or more software blocks, and/or previously developed versions of embedded system software. CPU 111 may access the information stored in storage 114 to retrieve existing software blocks for use in a software design environment. It is contemplated that storage 114 may store additional and/or different information than that listed above.

I/O devices 116 may include one or more components configured to communicate information with a user associated with computer system 110. For example, I/O devices may include a console with an integrated keyboard and mouse to allow a user to input parameters associated with computer system 110. I/O devices 116 may also include a display including a graphical user interface (GUI) for outputting information on a monitor. I/O devices 116 may also include peripheral devices such as, for example, a printer for printing information associated with computer system 110, a user-accessible disk drive (e.g., a universal serial bus (USB), port, a floppy, CD-ROM, or DVD-ROM drive, etc.) to allow a user to input data stored on a portable media device, a microphone, a speaker system, or any other suitable type of interface device.

Interface 117 may include one or more components configured to transmit and receive data via a communication network, such as the Internet, a local area network, a workstation peer-to-peer network, a direct link network, a wireless network, or any other suitable communication platform. For example, interface 117 may include one or more modulators, demodulators, multiplexers, demultiplexers, network communication devices, wireless devices, antennas, modems, and any other type of device configured to enable data communication via a communication network.

Systems and methods associated with software design environment 100 are adapted to provide solutions for designing hardware and software elements associated with control systems for heavy machinery such as, for example, engine systems (e.g., turbines, diesel engines, etc.), earth moving machines, on-highway vehicles, off-highway vehicles, haulers, dozers, track-type tractors, manufacturing equipment or any other type of machine. Is it also contemplated that software design environment 100 (and any components or tools associated therewith) may be adapted for use in any industry where it may be advantageous to design and develop control software for embedded systems.

It is understood that the figures described above are exemplary only and not intended to be limiting. Software design tool 140 may use descriptive text, lists, trees, combos, and other means to display and interact with design content. Any and all portions of the graphical user interface may not have visual characteristics of the physical hardware and/or symbolic indication of software characteristics. Software design environment 100 and/or software design tool 140 may include multiple tools from multiple vendors. An existing commercially available tool for model-based development may be employed with customization and/or integration with new tools for implementation of the embodiments.

Figure 6:
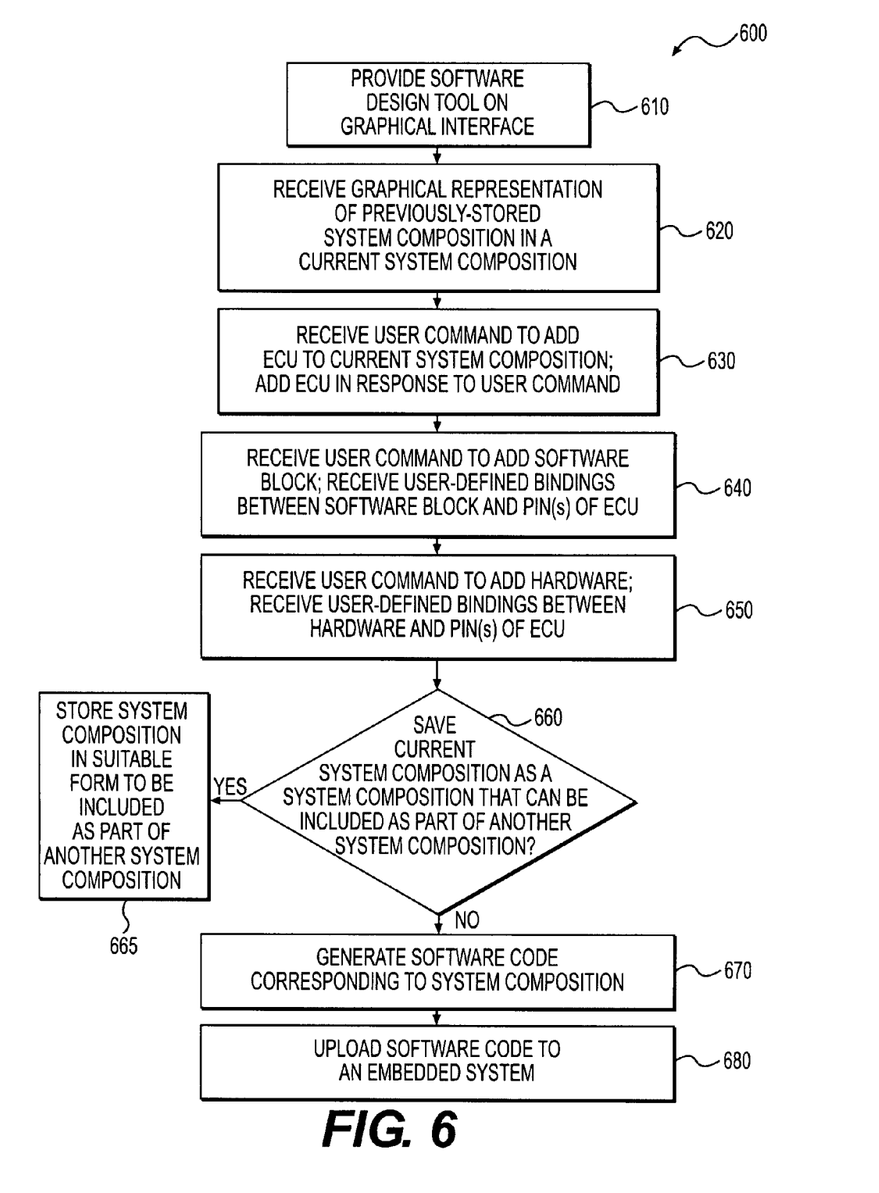
FIG. 6 provides a flowchart depicting an exemplary method for hierarchical hardware mapping in a software design environment.

Processes and methods consistent with the disclosed embodiments allow users to easily reuse previously-developed system compositions in the design and implementation of embedded software for machine control systems. Specifically, the methods and associated software design techniques described herein allow users to incorporate graphical representations of blocks of hierarchical software functionality within hardware system composition maps and define the associations (i.e., bindings) between the function blocks and particular components of the hardware system compositions. These associations may be stored and retained in an appropriate format for retrieval in subsequent system compositions. FIG. 6 provides a flowchart 600 illustrating an exemplary method for hierarchical hardware mapping in a software design environment.

As illustrated in FIG. 6, a software design tool 140 consistent with the disclosed embodiments may be provided to a user on a graphical interface of computer system 110 (Step 610). As explained, software design tool 140 may include one or more interactive software programs configured to enable users to construct, analyze, debug, and compile software for defining operations of embedded systems.

Software design tool 140 may receive/detect a user command to add a graphical representation of a previously-stored system composition in a current system composition (Step 620). Consequently, software design tool may incorporate the previously-stored system composition within the design view for the current system composition. This allows users to reuse and expand upon previously-stored, pre-designed, or pre-existing software compositions.

Software design tool 140 may be configured to receive user commands to add an electronic control unit (ECU) to a current system composition (Step 630). In response to the user command, software design tool 140 may add the ECU to the current design window.

Similarly, software design tool 140 may be configured to receive user command(s) to add software block(s) and receive user-defined bindings between the software block and one or more pin(s) of the ECU (Step 640). Software design tool 140 may create bindings between the software and one or more pins of the ECU, based on the user-defined binding definitions, thereby associating the software with the corresponding pins of the ECU.

Software design tool 140 may also be configured to add additional hardware to the current system composition, and receive user-defined bindings between hardware and pin(s) of the ECU (Step 650). For example, a particular system composition may require additional sensors and actuators corresponding to the newly-added ECU. Accordingly, the user may add graphical representations of the required sensors and actuators and associate each of the sensors and actuators with one or more pins of the ECU. Accordingly, hardware and software associated with the same pin create implied bindings between the hardware and software.

Once additional ECUs, hardware, and software have been added, a user may determine whether to save the current system composition as a system composition that can be included as part of another system composition (Step 660). If the user wishes to save the current system composition for reuse as part of another system composition (Step 660: Yes), the user may perform a save feature available in system design tool 140 that stores the system composition in a suitable form to be included as part of another system composition (Step 665). This save process may involve creating a name for the partial system composition, which may be provided on a design palette with other previously-stored system compositions.

If the user decides not to save the current system composition for reuse in other system compositions (Step 660: No), software design tool may generate embedded software code corresponding to the system composition and bindings associated therewith (Step 670). The embedded software code may them be uploaded or otherwise stored in memory of one or more embedded systems (Step 680) and may be executed by a CPU associated with the embedded systems, thereby defining the operation of the embedded system consistent with the system composition designed within software design tool 140.

It is contemplated that the ordering of process steps of FIG. 6 is exemplary only and not intended to be limiting. Accordingly, certain process steps may be performed before or simultaneously with one or more of the other process steps. Moreover, it is also contemplated that certain process steps may be selectively repeated or iterated, based on user commands. Thus, for example, a user may wish to add multiple software and hardware blocks to a current system composition. Accordingly, the user may repeat process steps 640 and 650 before proceeding to subsequent process steps.

INDUSTRIAL APPLICABILITY

Methods and systems consistent with the disclosed embodiments enable the development of generic component blocks that be re-used and re-configured easily by making blocks embedded in sub-levels of hierarchical blocks accessible to other blocks at any level of the design. Software design tools that employ processes and elements consistent with certain disclosed embodiments allow users flexibility in defining hardware connectivity and functional maps of specific hardware components, based on the needs of a particular design. As a result, users that rely on designing systems from existing components, where particular aspects of a system design may be implemented or manipulated simply by reconfiguring elements in a sublevel of the system, may become more efficient and productive.

Although the disclosed embodiments are described in relation to hierarchical hardware design in software design programs, the disclosed systems and methods may also be implemented in any environment where it may be advantageous to allow accessibility and mapping of software blocks and data elements embedded within sublevels of higher-level software blocks. Specifically, the disclosed hierarchical design tool may be employed to design hardware, software, or hybrid systems (e.g., combination hardware and software systems.)

The presently disclosed method for hierarchical hardware mapping in software design may have several advantages. First, because the presently disclosed method for hierarchical hardware provides a tool that expands the hierarchical development capabilities of functional blocks within hardware system compositions by providing users with a tool that simultaneously updates system and functional compositions based on binding associations between hardware and software blocks, users may realize greater flexibility over conventional functional modeling tools. For example, using the methods described herein for binding functional compositions to system compositions, changes to software or functional compositions may prompt automatic updates to system compositions and/or notifications to the user that a particular software or functional composition has been changed, thereby prompting the user to make a corresponding change to the system configuration.

Furthermore, the presently disclosed method for hierarchical hardware mapping may increase productivity associated with software design for embedded systems. For instance, previously-stored system compositions may be implemented within subsequent system designs using a variety of incorporation methods, with updates to the previously-stored or "master" system composition causing automatic updates to the invoked instances of the previously-stored system composition in an active system composition design. By providing a means for modifying functional or system compositions simultaneously based on changes made to a corresponding composition may limit the time required to make these modifications manually for each instance of a particular composition. As a result, the presently disclosed embedded software design method may significantly reduce design time, resulting in more effective and timely deployment of embedded system software.

It will be apparent to those skilled in the art that various modifications and variations can be made to the disclosed method and system for hierarchical hardware mapping. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A method, executed by at least one processor, for hierarchical hardware mapping in a software design environment, the method comprising:
   providing a software design tool on a graphical interface of a computer system;
   receiving, in the software design tool, a selection of a graphical representation of a hardware electronic control unit (ECU);
   receiving, in the software design tool:
      a selection of a binding between a graphical representation of first software and the ECU, the selection defining a first hierarchical software level; and
      a selection of a binding between a graphical representation of second software and the ECU, the selection defining a second hierarchical software level;
   associating the first and second hierarchical levels to form a system composition in which the first hierarchical software level includes the second hierarchical software level; and storing the system composition for use in one or more software designs.

2. The method of claim 1, further including generating at least a portion of software code associated with the system composition.

3. The method of claim 2, further including providing the at least a portion of software code to an embedded system associated with the ECU, wherein the at least a portion of software code, when executed by a processor associated with the embedded system, is configured to control an operational aspect associated with one or more components associated with the embedded system.

4. The method of claim 1, further including receiving, by the software design tool, a user-defined restriction that limits at least one of the first or second software to a particular thread of execution, virtual memory space, processor, or type or instance of ECU.

5. The method of claim 4, further including restricting, by the software design tool and based on one or more rules, at least one of the bindings to a particular type of ECU.

6. The method of claim 1, further comprising simulating, by the software design tool, the system composition based on at least one of the first or second software.

7. The method of claim 1, wherein the system composition is defined by a hierarchy of function block diagrams.

8. The method of claim 1, wherein the graphical representations include at least one of descriptive text, visual characteristics of the ECU, or a symbolic indication of characteristics associated with at least one of the first or second software.

9. A non-transitory computer-readable storage medium for use on a computer system, the computer-readable medium storing computer-executable instructions for performing the method of claim 1.

10. The method of claim 1, wherein the bindings bind the first and second software to one or more pins of the ECU.

11. The method of claim 1, wherein at least one of the first or second software is for performing operations of a sensor, an actuator, or the ECU.

12. A computer system comprising:
a display;
a processor configured to:
provide a software design tool on a graphical interface of a computer system;
receive, in the software design tool, a selection of a binding between a graphical representation of first software and one or more pins of a graphical representation of a hardware electronic control unit (ECU), the selection defining a first hierarchical software level;
receive, in the software design tool, a selection of a binding between a graphical representation of second software and one or more pins of a graphical representation of a second ECU, the selection defining a second hierarchical software level;
associate the first and second hierarchical levels to form a system composition in which the first hierarchical software level includes the second hierarchical software level; and
store the system composition for use in one or more software designs.

13. The computer system of claim 12, the processor being further configured to generate at least a portion of software code associated with the system composition.

14. The computer system of claim 13, the processor being further configured to provide the software code to the an embedded system, wherein the at least a portion of software code, when executed by a processor associated with the embedded system, is configured to control an operational aspect associated with one or more components associated with the embedded system.

15. The computer system of claim 12, the processor being further configured to receive, by the software design tool, a user-defined restriction that limits at least one of the first or second software to a particular thread of execution, virtual memory space, processor, or type or instance of ECU.

16. The computer system of claim 15, the processor being further configured to restrict, in the software design tool and based on one or more rules, at least one of the bindings to a particular type of ECU.

17. The computer system of claim 12, wherein the system composition is configured to be simulated by the software design tool.

18. The computer system of claim 12, wherein the system composition is defined by a hierarchy of function block diagrams.

19. The computer system of claim 12, wherein the graphical representations include at least one of descriptive text, visual characteristics of at least one of the first or second ECU, or symbolic indication of characteristics associated with at least one of the first or second software.

20. The computer system of claim 12, wherein the first software is for performing operations of a sensor, an actuator, or the first ECU, and the second software is for performing operations of a sensor, an actuator, or the second ECU.

21. A method, executed by at least one processor, for mapping a software hierarchy to hardware in a software design environment, the method comprising:
providing a software design tool on a graphical interface of a computer system;
receiving, in the software design tool, a selection of a graphical representation of a first portion of software and a second portion of software;
receiving, in the software design tool, a user designation associating a first level of the software hierarchy with:
a binding of the first portion of software to a first hardware electronic control unit (ECU), a processor associated with the first ECU, and a memory device associated with the first ECU; and
a binding of the second portion of software to one or more pins of the first ECU;
receiving, in the software design tool, a selection of a graphical representation of a third portion of software and a fourth portion of software;
receiving, in the software design tool, a user designation associating a second level of the software hierarchy with:
a binding of the third portion of software to a second hardware ECU, a processor associated with the second ECU, and a memory device associated with the second ECU; and
a binding of the fourth portion of software to one or more pins of the second ECU; and
storing the user designations for use in one or more software designs.

22. The method of claim 21, further including notifying, by the software design tool, a user of the computer system that an association between at least one of the first ECU or the second ECU and a level of the software hierarchy is required.

23. The method of claim 21, further including maintaining, by the software design tool, a list of user designations and a software hierarchy corresponding to each of the user designations.

24. A method, executed by at least one processor, for hierarchical hardware mapping in a software design environment, the method comprising:

provides a software design tool on a graphical interface of a computer system;

receiving, in the software design tool, a selection of a graphical representation of of first software and second software;

receiving, in the software design tool, a selection of a graphical representation of a first hardware electronic control unit (ECU) and a second hardware ECU;

receiving, in the software design tool, a selection of one or more bindings between the first software and the first ECU, the selection defining a first hierarchical software level;

receive, in the software design tool, a selection of one or more bindings between the second software and the second ECU, the selection defining a second hierarchical software level;

associating the first and second hierarchical software levels to form a system composition in which the first hierarchical software level includes the second hierarchical software level; and storing the system composition for use in one or more software designs.

25. The method of claim 24, wherein the bindings bind the first and second software to one or more pins of the ECU.

26. The method of claim 24, wherein the first software is for performing operations of a sensor, an actuator, or the first ECU, and the second software is for performing operations of a sensor, an actuator, or the second ECU.

* * * * *